United States Patent [19]
Ikeda et al.

[11] Patent Number: 5,738,948
[45] Date of Patent: Apr. 14, 1998

[54] ELECTRODE-WIRING MATERIAL AND ELECTRODE-WIRING SUBSTRATE USING THE SAME

[75] Inventors: Mitsushi Ikeda, Yokohama; Yoshiko Tsuji, Kawasaki; Yujiro Hara, Tokyo; Masaki Atsuta, Yokosuka; Yoshifumi Ogawa, Kawasaki; Toshiyuki Oka, Yokohama; Momoko Takemura, Tokyo, all of Japan

[73] Assignee: Kabushiki Kaisha Toshiba, Kawasaki, Japan

[21] Appl. No.: 536,608

[22] Filed: Sep. 29, 1995

[30] Foreign Application Priority Data

Sep. 29, 1994 [JP] Japan .................. 6-233932

[51] Int. Cl.[6] .................. G02F 1/1343; C22C 27/04
[52] U.S. Cl. .................. 428/663; 428/665; 420/429; 420/430
[58] Field of Search .................. 428/663, 664, 428/665, 666, 621, 457, 620, 660; 420/429, 428, 430, 417, 421; 349/139, 148

[56] References Cited

U.S. PATENT DOCUMENTS

| | | | |
|---|---|---|---|
| 5,143,866 | 9/1992 | Matsutani | 437/187 |
| 5,281,554 | 1/1994 | Shimada et al. | 437/180 |
| 5,350,948 | 9/1994 | Maehara | 257/763 |
| 5,492,605 | 2/1996 | Pinarbasi | 204/192.11 |

FOREIGN PATENT DOCUMENTS

| | | |
|---|---|---|
| 1-231024 | 9/1989 | Japan . |
| 4-240824 | 8/1992 | Japan . |

*Primary Examiner*—John J. Zimmerman
*Attorney, Agent, or Firm*—Oblon, Spivak, McClelland, Maier & Neustadt, P.C.

[57] ABSTRACT

The present invention discloses an electrode wiring material including at least one main element selected from the group consisting of Mo and W and an additional element selected from the group consisting of Kr and Xe in an amount of 0.0003 atomic % to 3 atomic %. The present invention further discloses an electrode wiring substrate including an electrode wiring formed on a glass substrate, wherein the electrode wiring is formed of at least one metal selected from the group consisting of Mo and W and the lattice constant of the electrode wiring material is almost equal to the lattice constant of the electrode wiring material in a bulk state.

48 Claims, 6 Drawing Sheets

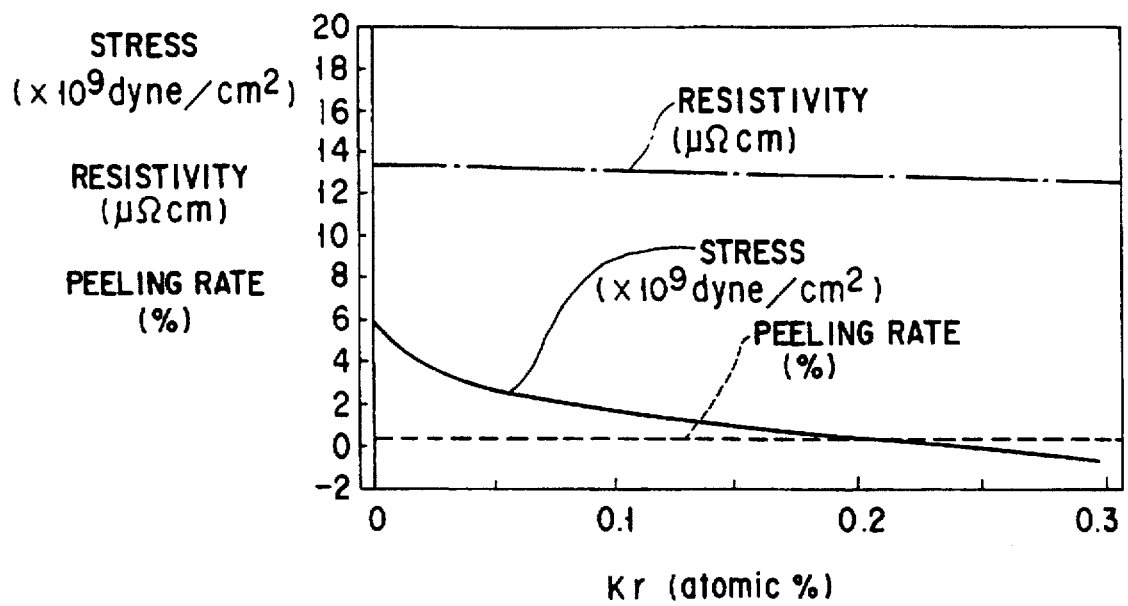
F I G. 1
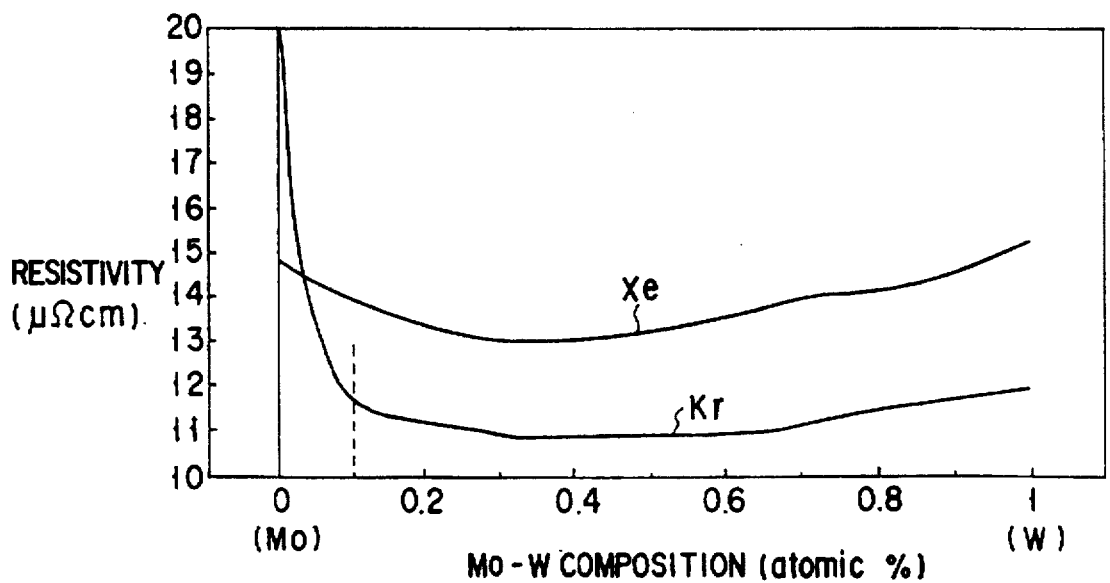
F I G. 2

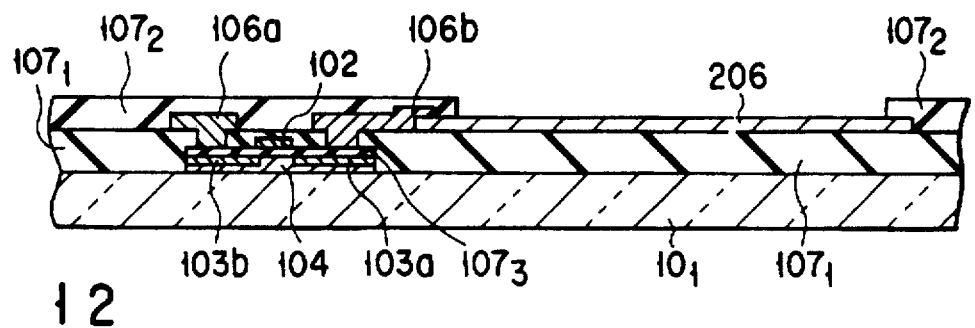
F I G. 12
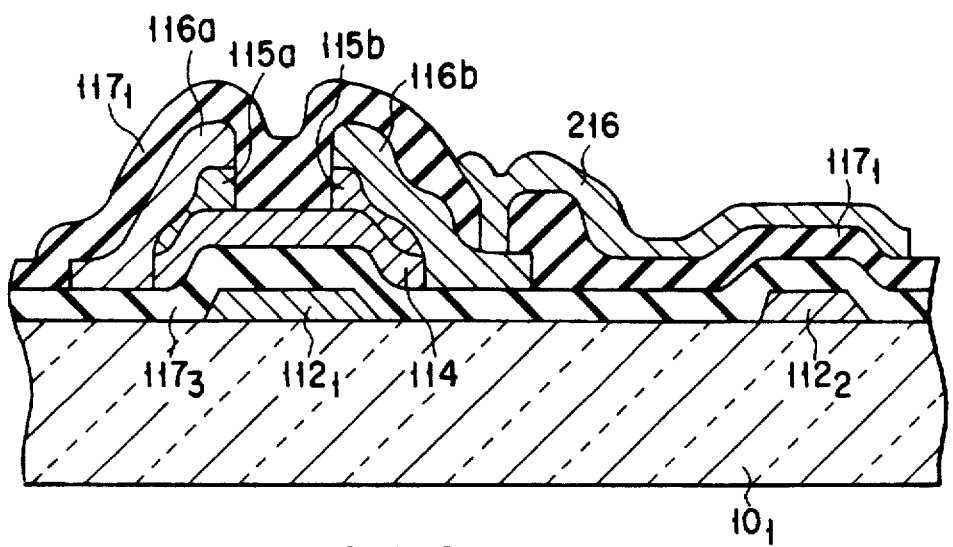
F I G. 13
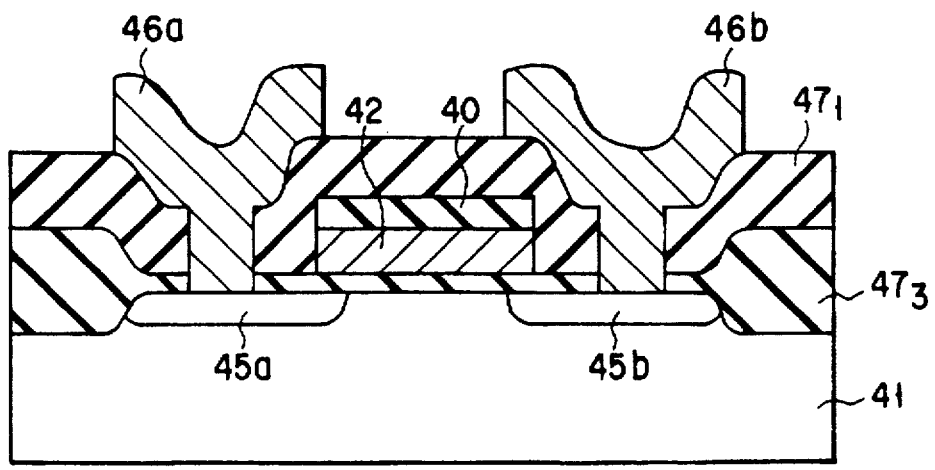
F I G. 14

ELECTRODE-WIRING MATERIAL AND ELECTRODE-WIRING SUBSTRATE USING THE SAME

BACKGROUND OF THE INVENTION

1. Field of the Invention

The present invention relates to an electrode-wiring material and an electrode-wiring substrate using the same.

2. Description of the Related Art

Recently, it has been greatly expected that a liquid-crystal display device of the active matrix type which comprises thin film transistors (hereinafter, simply referred to as "TFTs") made of amorphous silicon (hereinafter, simply referred to as "a-Si") film serving as switching elements, made it possible to realize a panel display having a large display area and providing high-definition and high-quality images at low cost.

When a panel display having a large display area is formed, it is inevitable that the overall extension length of address wiring tremendously increases. As a result, the resistance of the address wiring increases, causing a marked delay in the gate pulse which is provided to each switching element. Consequently, it becomes impossible to control the applied voltage to liquid crystal sufficiently. Accordingly, the material for address wiring and the like must be made of a material having sufficiently low resistivity. For this reason, at present, aluminum (Al) is employed as the material for the wiring and electrode having low resistivity.

However, when Al is employed as an electrode-wiring material, in some cases, hillocks or round bulges appear in the formed electrode or wiring. In addition, Al is disadvantageous for low corrosion resistance. Hence, if an electrode-wiring substrate is prepared by using Al having the disadvantages mentioned above as an electrode-wiring material and various elements are formed thereon, the elements thus-formed are hardly operated with high reliance. As mentioned above, since Al limits processes for forming electrodes and wiring in various respects, Al is not preferable material for electrode-wiring.

SUMMARY OF THE INVENTION

The present invention has been made in view of the aforementioned disadvantages and intended to provide an electrode-wiring material having sufficiently low resistivity as well as being easy to handle. The present invention is further intended to provide a highly reliable electrode-wiring substrate by using the electrode-wiring material.

According to a first aspect of the present invention, there is provided an electrode-wiring material containing, as a main component, at least one element selected from the group consisting of Mo and W and an additional element selected from the group consisting of Kr and Xe, in an amount of 0.0003 to 3 atomic %.

In the first aspect of the present invention, there is further provided an electrode-wiring material containing W as a main component or at least one element selected from the group consisting of W, Mo and Cr as a main component and an additional element selected from the group consisting of Kr and Xe in an amount of 0.0003 to 3 atomic %.

In a second aspect of the present invention, there is provided an electrode-wiring substrate comprising electrode-wiring formed on a glass substrate, wherein the electrode-wiring is made of at least one metal selected from the group consisting of Mo and W and the ratio of the lattice constant of the electrode-wiring material to the lattice con- stant of the material for electrode-wiring coincide with that of bulk state within ±3%.

In the second aspect of the present invention, there is further provided an electrode-wiring substrate comprising an electrode-wiring formed on a glass substrate, wherein the electrode-wiring comprises W or at least one metal selected from the group consisting of W, Mo and Cr and the ratio of the lattice constant of the electrode-wiring material to the lattice constant of the electrode-wiring material in a bulk state coincides within ±3%.

BRIEF DESCRIPTION OF THE DRAWINGS

FIG. 1 is a characteristic diagram showing the relationship between stress, resistivity, film-peeling ratio and Kr content in a film;

FIG. 2 is a characteristic diagram showing the relationship between resistivity and Mo content;

FIGS. 12 and 13 are sectional views showing another liquid-crystal driving circuit boards of the liquid-crystal display device using the electrode-wiring material of the present invention; and FIG. 14 is a sectional view of a circuit board of a semiconductor device using the electrode-wiring material of the present invention.

DETAILED DESCRIPTION OF THE PREFERRED EMBODIMENTS

Figure 3:
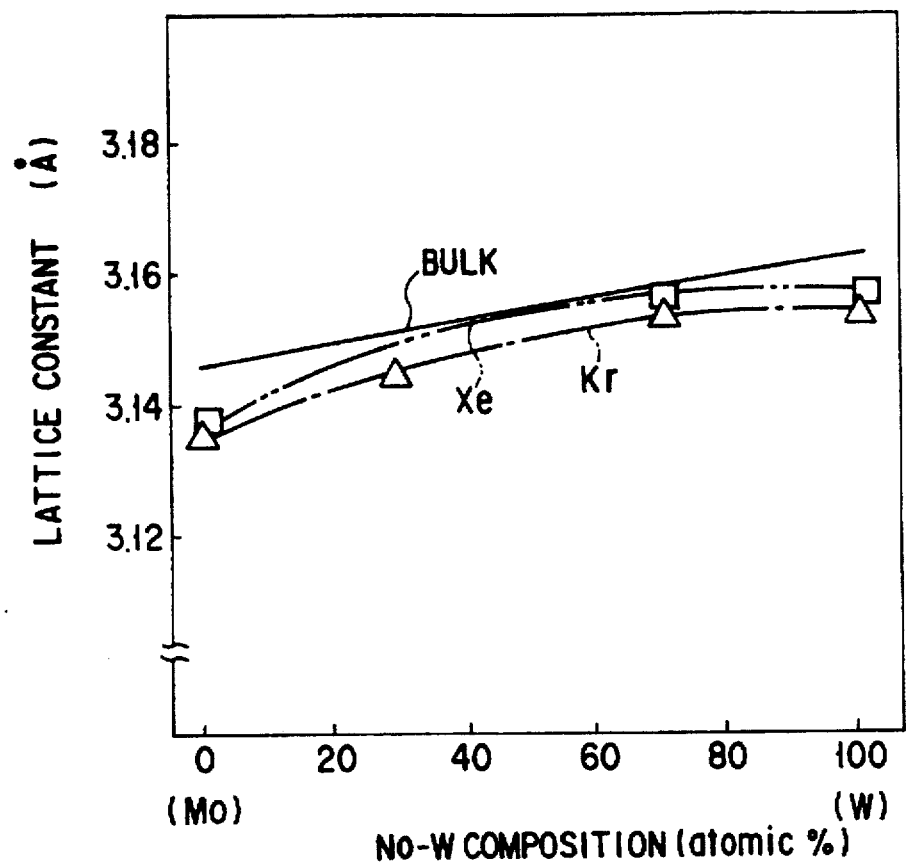
FIG. 3 is a characteristic diagram showing the relationship between the lattice constant determined by an X-ray as a function of Mo content.

The electrode-wiring material according to the present invention is characterized in that Xe or Kr is contained in a predetermined content in the material, unlike the conventional electrode-wiring material such as W and Mo. Owing to this characteristic, the electrode-wiring material of the present invention exhibits sufficiently low resistivity and ensures excellent corrosion resistance in comparison with Al or the like.

If the electrode-wiring material mentioned above is employed, the film for the electrode-wiring can be formed by sputtering which is performed in a gas atmosphere such as Kr or Xe. In this case, it is necessary to control various conditions for film formation such as power and pressure of a sputtering apparatus.

Since Kr and Xe have sufficiently larger molecular weights than Ar in rare gas elements, they can provide high energy when a film is formed. Consequently, a film can be formed with a good crystal structure and thus its resistivity is successfully reduced. Since a film having a good crystal structure can be formed. the lattice constant of the material used in the film can be set almost equal to the lattice constant of the material in a bulk state. "The lattice constant ... can be set almost equal to the lattice constant ... " mentioned above means that the ratio of the lattice constant of the material used in a film to the lattice constant of the material in a bulk state coincides within ±3%, preferably within ±1%.

When use is made of the electrode-wiring material of the present invention. an electrode-wiring may be prepared in the form of a single phase mainly consisting of Mo or W. Alternatively, the electrode-wiring may be formed together with an Mo alloy or W alloy, or a metal having a high-melting point such as Cr. If Mo or W is used in alloy form mentioned above, the electrode-wiring having low resistivity can be obtained.

In the first aspect of the present invention. the amount of Kr or Xe to be added to a main metal component is adjusted within the range from 0.0003 to 3 atomic %. If the addition amount of Kr or Xe is less than the lower limit, it will be difficult to form a film industrially, because very slow deposition rate is necessary to form such low gas content films. If the amount exceeds the upper limit, the resistivity of the film will rapidly increase. The amount of Kr is more preferably from 0.0003 to 1 atomic %, most preferably from 0.0003 to 0.5 atomic %. The amount of Xe is more preferably from 0.001 to 1 atomic %.

In the second aspect of the present invention, it is preferred that the electrode-wiring is formed by a sputtering method, thereby forming a film having high adhesion on a substrate of a large display area.

In the first and second embodiments of the present invention, it is preferred that Ti be added to a main component, thereby improving the adhesion and acid resistance.

In the first and second embodiments of the present invention, when a main metal component is at least one metal selected from the group consisting of Mo and W, the content of W or Mo is preferably within the range from 10 to 95 atomic %. This is because if the content of W or Mo is within the range from 10 to 95 atomic %, it is possible to broaden the margin of the sputtering conditions to form a film having low resistivity.

The electrode-wiring substrate of the present invention may be used a circuit board on which liquid-crystal display device and semiconductor device are formed.

Hereinbelow, the present invention will be described on the basis of the experiments conducted by the present inventors.

First, we will explain the relationship between the Kr or Xe content in an electrode film formed of the electrode-wiring material of the present invention and its influence on the electrode film.

The Mo—W alloy film (Sample 1) of 300 nm in thickness was prepared by depositing Mo—W containing 65 atomic % of Mo on a glass substrate in an atmosphere having a Kr gas pressure of 0.6 Pa, using a sputtering apparatus of the sheet-fed load-lock type and setting a temperature of the substrate before the film formation to 200° C., the power for use in the film formation to 10 kW and the distance between electrodes to 5 cm. It should be noted that the Kr content in the film of Sample 1 was 0.001 as measured by fluorescent X-ray film device SYSTEM 3271 (trade name, manufactured by Rigaku Denki Kogyo-sha). In addition, when the resistivity was measured with respect to Sample 1, it was 12 μΩ.cm.

Moreover, the Mo—W alloy film (Sample 2) of 300 nm in thickness was prepared by depositing Mo—W containing 30 atomic % of Mo on a glass substrate in an atmosphere having a Kr gas pressure of 0.6 Pa, using a sputtering apparatus of the sheet-fed load-lock type and setting a temperature of the substrate before the film formation to 200° C., the power for use in the film formation to 10 kW and the distanced between electrodes to 5 cm. It should be noted that the Kr content of the film of Sample 2 was 0.001 atomic %. When the resistivity of Sample 2 was measured, it was 13 μΩ.cm.

According to the experiments conducted by the present inventors, it was found that when the Xe or Kr content in a film exceeds 3 atomic %, the resistivity rapidly increases. On the other hand, when the Mo or W content in a film is out of the range of 10 to 95 atomic %, the resistivity increases in the same manner as above.

As mentioned above, it is demonstrated that if the resistivity is taken into consideration, Kr or Xe is preferably added to the material in an amount of 3 atomic % or less. On the other hand, when the content of Kr or Xe is less than 0.0003 atomic %, it is necessary to reduce a sputtering rate sufficiently low by lowering the power for film formation. In addition, it is required to recrystallize the material used in the film after the film is formed. Hence, it is demonstrated that the electrode-wiring material containing Kr or Xe in an amount of less than 0.0003 atomic % is quite improper for industrial use.

Furthermore, the present inventors prepared Mo—W alloy films of 400 nm in thickness having different Kr contents by depositing Mo—W alloy containing 65 atomic % of Mo on a glass substrate, using the sheet-fed load-lock sputtering apparatus mentioned above, and varying the film-forming conditions.

FIG. 1 is a characteristic diagram showing the relationship between stress, resistivity, film-peeling rate and Kr content in a film. It is demonstrated that excellent characteristics are exhibited in the range of 0.0003 to 3 atomic % with respect to any one of stress, resistivity or film-peeling rate. On the other hand, in the Mo—W alloy films containing Kr formed by different sputtering apparatuses, the stress does not simply decrease but fluctuated with an increase in the Kr content. Hence, it is found that stress is strongly dependent upon the sputtering machine.

From the foregoing, in the electrode-wiring material of the present invention, it is designed that an additional element selected from the group consisting of Kr and Xe is contained in an amount of 0.0003 to 3 atomic %. These additional elements can be blended alone or in a mixed form with the main metal component of the electrode-wiring material. When the additional elements are blended in a mixed form, the features imparted by individual additional elements are combined together and create the feature of the formed film.

Hereinbelow, we will describe the dependency of resistivity upon a gas for use in film formation and upon the composition of film with reference to FIG. 2 which shows the relationship between resistivity and Mo content. A sample film was prepared by depositing the sample material on a glass substrate in a thickness of 300 nm in the atmosphere having a Kr or Xe gas pressure of 0.5 Pa, using the small sputtering apparatus of the sheet-fed load-lock type, setting the temperature of the substrate before film-formation to 150° C., the power for the film-formation to 2 kW, and the distance between electrodes to 5.5 cm. It should be noted that Kr or Xe is contained in each film in an amount within the scope of the present invention.

As is apparent from FIG. 2, the larger the Mo content, the lower the resistivity. When the film formation is carried out in a Xe or Kr atmosphere, a film having low resistivity is obtained in the range of 90 atomic % or less, furthermore, 80 atomic % to 5 atomic % less in terms of Mo content. This result is satisfactory and better than that formed in an Ar atmosphere.

FIG. 3 is a characteristic diagram showing the relationship between Mo content and lattice constant measured by an X-ray. As is apparent from FIG. 3, when a film is formed in a Xe or Kr atmosphere, in particular, in the Kr atmosphere, the lattice constant is close to that of the film material in a bulk state, providing good crystallinity. This is because Kr or Xe has considerably high molecular weight as compared with Ar and therefore providing high energy in forming a film. As a result, good crystallinity and low resistivity is attained. In fact, the film exhibited low resistivity in the case where it had a lattice constant whose difference with that of the film material in a bulk state falls within 1.03 times (0.97–1.03), preferably in 1.01 times (0.09–1.01).

Figure 4:
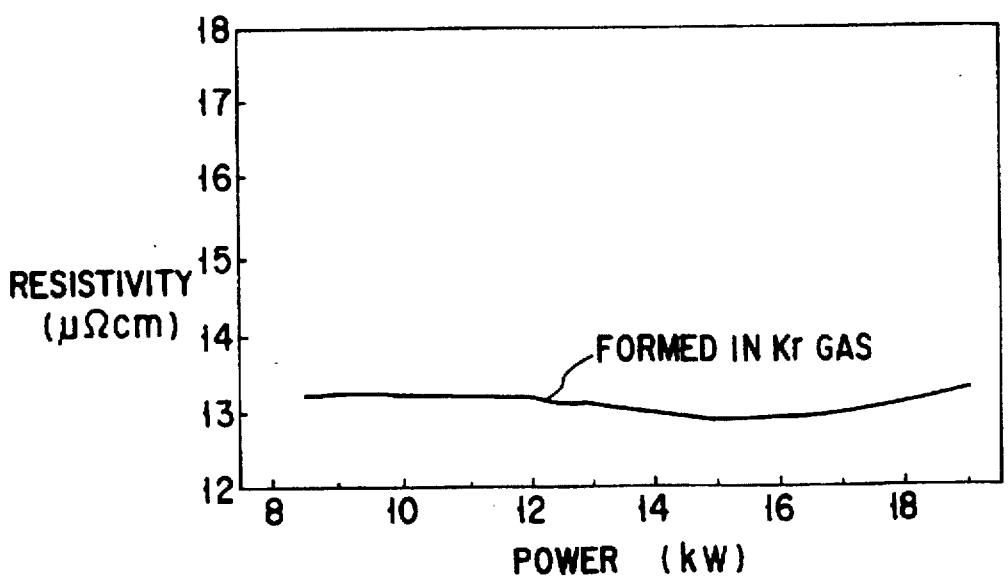
FIGS. 4 and 6 are characteristic diagrams showing the relationship between resistivity and film deposition power.
Figure 5:
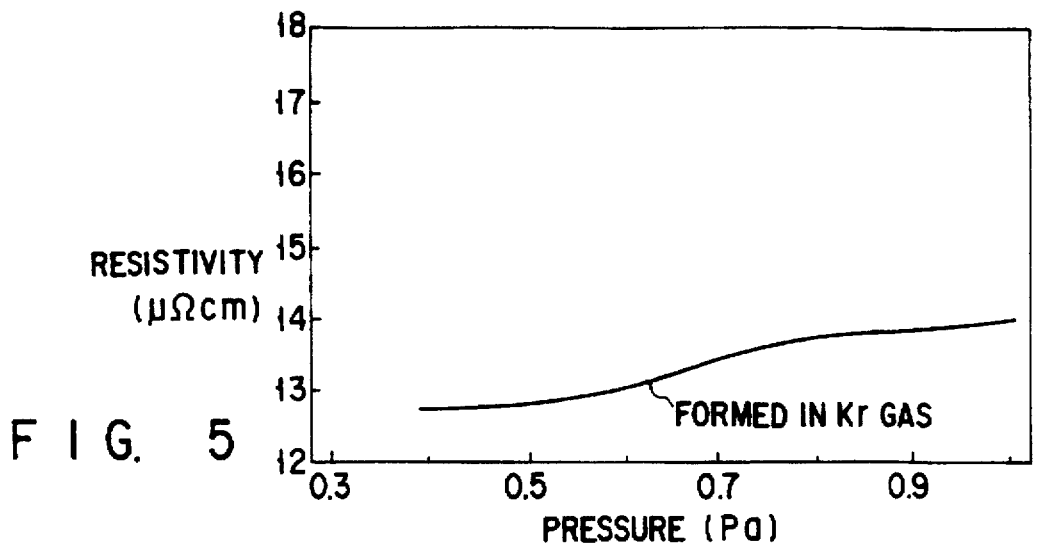
FIGS. 5 and 7 are characteristic diagrams showing the relationship between resistivity and gas pressure.

Referring now to FIGS. 4 to 7, we will describe the dependency of film-forming conditions upon the characteristics of the film. FIG. 4 is a characteristic diagram showing the relationship between resistivity and the power for forming film, and more specifically showing the dependency of the power for forming film upon the resistivity when film formation is carried out in an atmosphere of 0.9 Pa. FIG. 5 is a characteristic diagram showing the relationship between resistivity and gas pressure, and more specifically showing the dependency of resistivity upon gas pressure when 10 kW of power is used in forming film. In FIGS. 4 and 5, samples were allowed to deposit on a glass substrate in a Kr atmosphere using the sputtering apparatus of the sheet-fed load-lock type, setting the temperature of the substrate before forming film to 200° C., the distance between electrodes to 5 cm, thereby forming an Mo—W alloy film 400 nm in thickness containing Mo in an amount of 65 atomic %.

Figure 6:
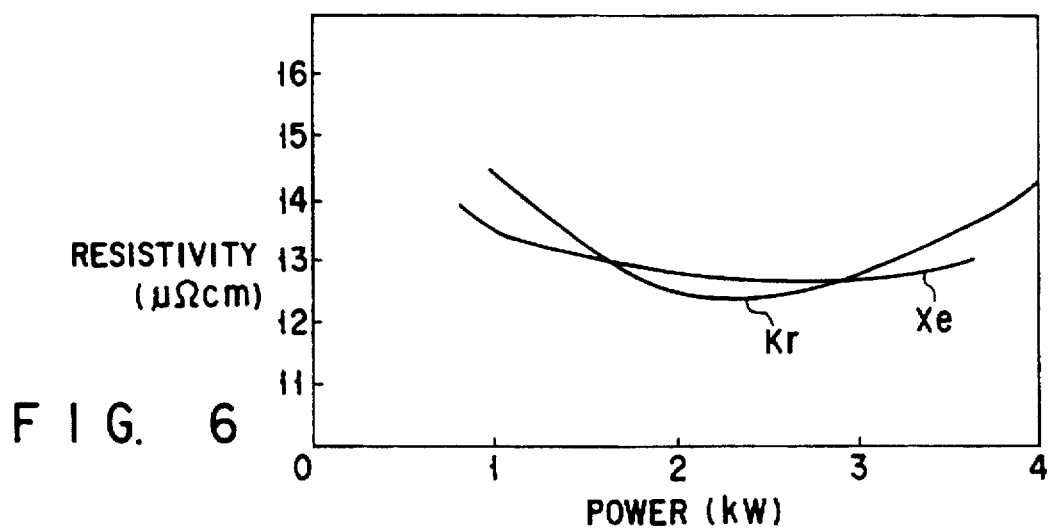
Figure 7:
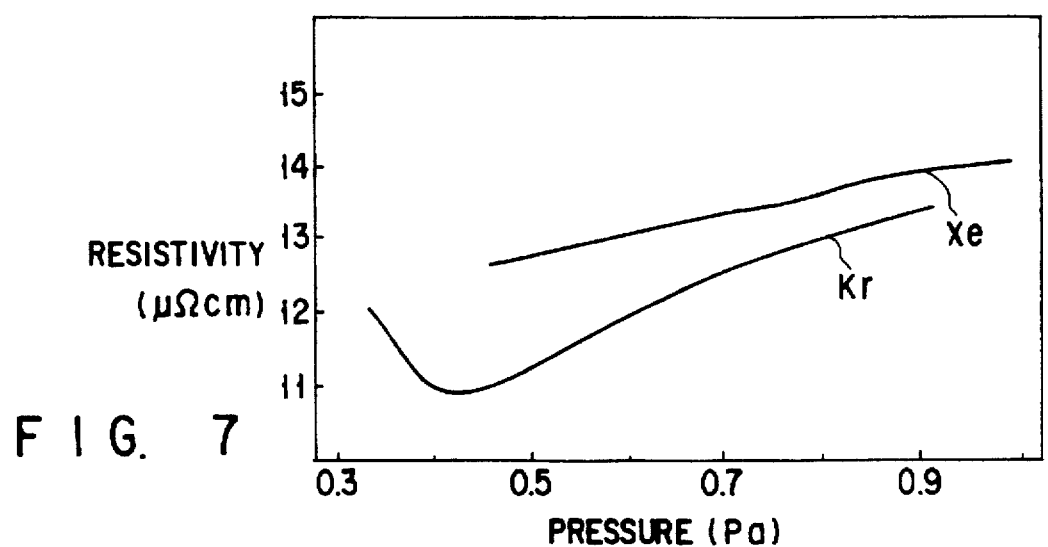

FIG. 6 is a characteristic diagram showing the relationship between resistivity and power for forming film, and more specifically showing the dependency of resistivity on the power when a film is formed in a gas pressure of 0.75 Pa. FIG. 7 is a characteristic diagram showing the relationship between resistivity and gas pressure, and more specifically showing the dependency of resistivity upon gas pressure when a film is formed at a power of 2 kW. The samples of FIGS. 6 and 7 are Mo—W alloy films containing Mo in an amount of 65 atomic % formed on a glass substrate in a film thickness of 300 nm in a Kr or Xe atmosphere using another small sheet-fed type sputtering apparatus, and setting the temperature of the substrate before forming film to 150° C. and the distance between electrodes to 5.5 cm. As is apparent from the aforementioned experimental results, film is formed differently depending upon the device and there are optimum conditions to minimize the resistivity when the film is formed in a Kr or Xe atmosphere.

According to the study on the relationship between film thickness and resistivity, it is found that the resistivity is slightly higher in the range of 30 nm or less in thickness but is constant in excess of 30 nm since a film is obtained in a constant quality.

Hereinbelow, the Embodiments of the present invention will be explained in detail with reference to drawings.
(Embodiment 1)

Figure 8:
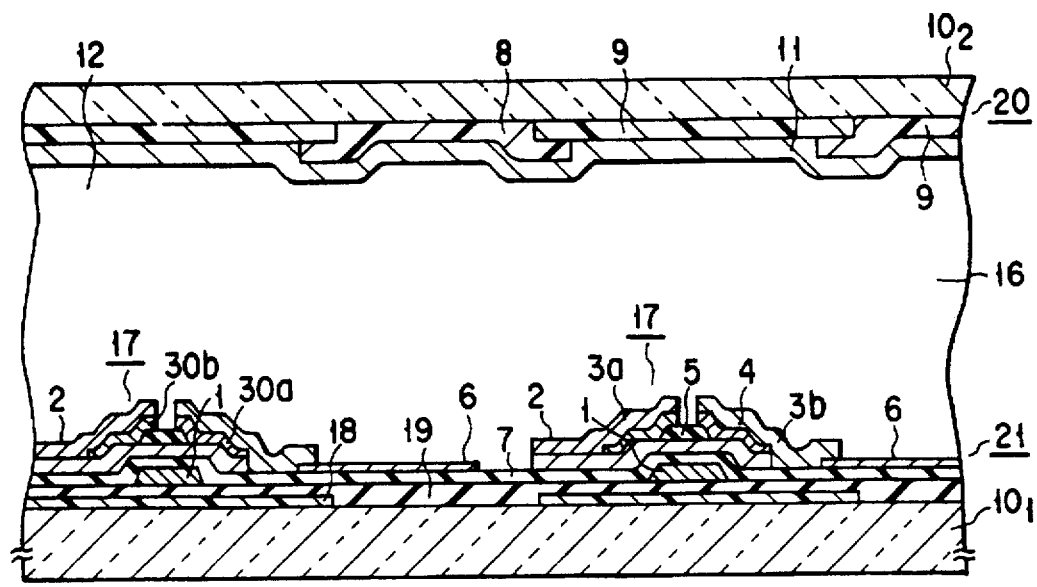
FIG. 8 is a cross-sectional view taken along the line VIII—VIII of FIG. 9.
Figure 9:
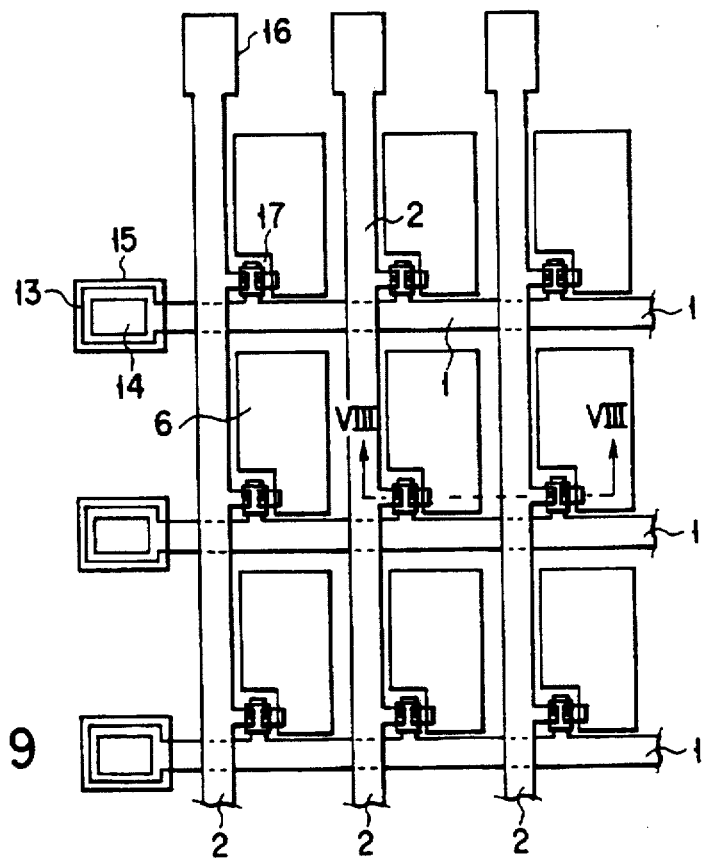
FIG. 9 is a plan view showing a driving circuit board of the liquid-crystal display device using the electrode-wiring substrate of the present invention.

FIG. 9 is a plan view showing the driving circuit board (electrode-wiring substrate) of a liquid-crystal device using the electric-wiring material of the present invention. FIG. 8 is a sectional view taken along the line VIII—VIII of FIG. 9. FIG. 9 shows only a pad serving as electrode wiring with another electrode. Hereinbelow, we will explain this embodiment, focusing on the constitution and manufacturing process of the TFT used herein and storage capacitance.

In FIG. 8, reference numerals $10_1$ and $10_2$ indicate glass substrates. On the glass substrate $10_1$, a black matrix 18 of the lower side is formed. On the black matrix 18, an insulating film 19 is formed. Furthermore, on the insulation film 19 is formed an Mo—W alloy gate electrode 1 by extending from address wiring which is integrally formed with the gate electrode. On the gate electrode 1, a semiconductor layer 4 and a stopper insulating film 5 are formed via an insulating film 7. The layer 4 and film 5 are respectively patterned.

The gate 1 was formed as follows: at first, the glass substrate $10_1$ was placed in the load-lock sputtering apparatus of the sheet-fed type. The initial temperature of the substrate, power for use in film formation and distance between electrodes were set to 150° C., 10 kW and 5 cm, respectively and then sputtering was performed in an atmosphere having a Kr gas pressure of 0.5 Pa using an Mo—W alloy target. Then, the Mo—W alloy containing 65 atomic % of Mo was allowed to deposit on the glass substrate $10_1$ to thereby form an Mo—W alloy film of 300 nm in thickness. In the film thus-formed, Kr was contained in an amount of 0.001 atomic %. The lattice constant of the film was 3.15 angstrom, which is almost equal to the lattice constant of the Mo—W alloy in a bulk state. The resistivity of the Mo—W alloy film was 13 $\mu\Omega$.cm, which is sufficiently low resistivity.

Subsequently, the Mo—W alloy film was taper-etched using the gas mixture of $CF_4$ and $O_2$, thereby forming the gate electrode 1 having a taper angle of 35°. To ensure good coverage with the gate insulating film, the gate electrode has a taper angle preferably in the range from 20° to 60°, more preferably from 25° to 50°.

Thereafter, on the gate electrode are mounted the insulating film 7 formed of a layered film consisting of an $SiO_2$ film and an $SiN_x$ film and the like; the semiconductor layer 4 consisting of a-Si:H and the like; and the stopper insulating film 5 consisting of SiNx. The layers thus-formed are respectively patterned.

Further, on this structure are formed a drain electrode 3a and a source electrode 3b consisting of Al/Mo or an Mo—W alloy. Reference numerals 30a and 30b in FIG. 9 indicate a source-drain region made of an n-type amorphous silicon. In this way, the TFT 17 is formed. To the source electrode 3b of the TFT 17, a picture element electrode 6 is connected. In this manner, a liquid-crystal driving circuit board 21 is formed. It should be noted that as the picture element electrode 6, use may be made of a transparent conductive material such as ITO or $SnO_2$.

A counter electrode 20 is formed as follows: on the glass substrate $10_2$ are formed a color filter 8 and a black-matrix 9 made of an Mo—W alloy, on which a counter electrode 11 made of ITO is further formed. The liquid-crystal driving circuit board 21 is placed on the opposite side of the counter substrate 20 as shown in FIG. 8 so as to sandwich a liquid-crystal material 16 therebetween. In this way, a liquid-crystal display device is fabricated.

On the glass substrate $10_1$, a plurality of address wirings 1 and a plurality of data wirings 2 are formed. The address wiring 1 has an address electrode pad 13 made of an Mo—W alloy on one of its two end. The data wiring 2 is crossed with the address wiring 1 at a right angle and has a data electrode pad 16 made of an Mo—W alloy on one of its two ends. At the intersection of the address wiring 1 and data wiring 2, an insulating film is provided between the address wiring 1 and the data wiring 2. The TFT 17 serving as a switching element is provided so as to adjoin the intersection. To one of the two electrodes of the TFT 17, namely, to the source electrode 3b, is connected the picture element electrode 6 formed on the picture element region surrounded by the address wirings 1 and data wirings 2. The region of address electrode pad 13 has a sufficiently large space to include an address electrode 15 and a contact hole 14.

The liquid-crystal display device having the aforementioned structure offers various advantages described below: as the display area becomes larger and acquires higher definition, the lower resistance is required for the liquid-crystal display device using the TFT. For example, in the case of a display (VGA) for a personal computer, wirings are 480×(640×3). In the display (XGA) for a high-grade personal computer, wirings are 760×(1024×3). Wirings used herein must have low resistance to prevent a delay in a gate pulse. The delay in the gate pulse is determined by a product CR of the wiring resistance R and the capacitance C of TFT attached to the wiring or of storage capacitance. With an increase in the display area, wiring becomes longer and R becomes inevitably larger. As a result, CR increases. On the other hand, if the number of picture elements increases, C ($C=C_oX_n$, $C_o$: content of a picture element, n: the number of picture elements) will increase. CR will also increases accordingly. Since C is determined depending upon the number of picture elements, to prevent a delay in the pulse, R must be reduced.

In the case where a display area (having a diagonal line of of 10 inches or more is formed in a usually-used design manner, VGA, SVGA, and XGA must have a resistivity of 40 μΩ.cm or less, 25 μΩ.cm or less, 20 μΩ.cm, respectively. Thus, as the wiring material for VGA, use may be usually made of Mo—Ta and Cr having a resistivity of approximately 40 μΩ.cm. Whereas, the Mo—Ta and Cr are not used as the wiring material for XGA. However, since the present embodiment employs a Kr-containing Mo—W alloy with a low resistivity of 20 μΩ.cm or less, it is possible to provide the high definition liquid-crystal display device of the VGA and XGA standard.

In this embodiment, the address wiring formed of an Mo—W alloy can be tapered by chemical dry etching (CDE) using the gas mixture of $CF_4$ and $O_2$. Furthermore, the address wire is tapered, without causing degradation of a resist, by wet-etching using an alkaline etchant (pH 7–13) containing an oxidizing agent having an oxidation-reduction potential higher than those of Mo and W and lower than that of Ti.

According to this embodiment, since the Mo—W alloy has low resistivity, the address wiring formed of an Mo—W alloy exhibits low resistivity. Therefore, a gate pulse can be provided to a predetermined switching element without causing a delay in the gate pulse due to the wiring resistivity.

Since the Mo—W alloy film can be tapered, the step-coverage with the interlayer insulating film formed on the address wiring formed of the Mo—W alloy film is improved, maintaining high insulating resistance pressure. To make taper-etching easy, it is desirable to provide an undercoat layer made of $SiO_2$, however, the undercoat layer can be eliminated in the taper-etching if the etching conditions are set appropriately.

Hence, the liquid-crystal display device having a large display area can be realized with high reliance. Even in a display whose display area is not large, it is possible to increase the aperture ratio of the display area since the wiring width can be reduced with a decrease in the resistivity of the address wiring.

In the liquid-crystal display device having the aforementioned structure, since the address electrode pad 13 as well as the data electrode pad 16 are formed of the same Mo—W alloy as used in the gate electrode mentioned above, ICs for image signals can adhere to these electrode pads more strongly in the process of chip-on-glass (COG) mounting. Hence, the highly reliable liquid-crystal display device is resulted.

On the other hand, since the Mo—W alloy has low reflectivity, if the Mo—W alloy is employed as a black matrix material, the reflection of the light incident on the display area can be reduced, attaining a high definition display.

Figure 10:
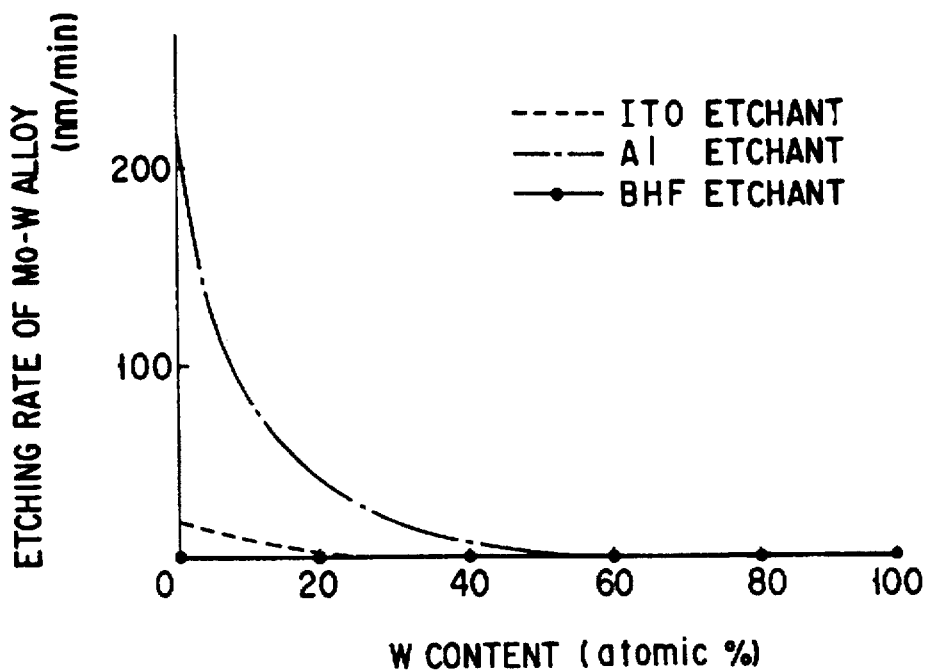
FIG. 10 is a characteristic diagram showing the relationship between the etching rate of an Mo—W alloy and W content.

As shown in FIG. 10, the Mo—W alloy is excellent in chemical resistance in the case where the Mo—W alloy contains W in an amount of 20 to 95%, in particular, in an amount of 25 to 90%. Actually, the etching rate of the material for picture element electrode was 10 nm/min or less in the case of an ITO etchant; the material for picture element electrode was not etched by BHF which is an etchant for the interlayer insulating film; and the etching rate in the case of an Al etchant was 30–400 nm/min or less. Particularly, it was found that if the Mo—W alloy containing W in an amount of 50% or more, the Mo—W alloy cannot be etched by any etchant. Therefore, when the Mo—W alloy is used as various wiring materials, fine-processing can be applied thereto. Owing to this feature, it is possible to provide high-definition liquid-crystal displays such as a VGA display device for a personal computer (wirings: 480×(640×3)) and an XGA display device for a high-quality personal computer (wirings: 760×(1024×3)).

Figure 11:
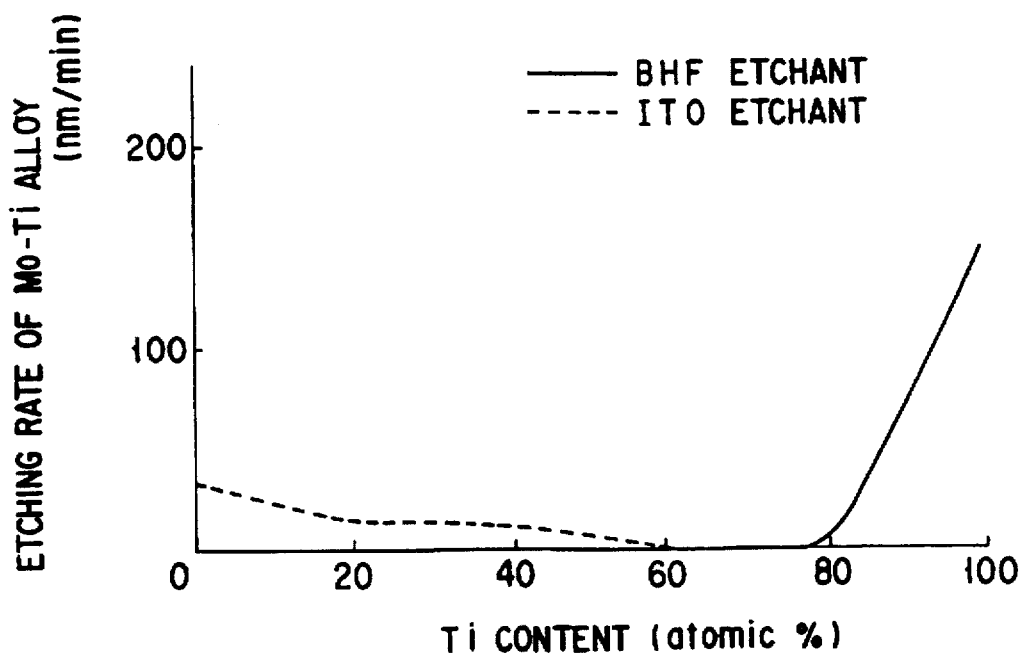
FIG. 11 is a characteristic diagram showing the relationship between the etching rate of the Mo—Ti alloy and W content.

The present inventors studied etching characteristics of an Mo—Ti alloy containing Kr in an amount of 0.01 atomic %, which has similar characteristics as those of the Mo—W alloy. As shown in FIG. 11, the Mo—Ti alloy containing Ti in an amount of 20 to 80% exhibits extremely excellent chemical resistance to the ITO etchant used in forming the picture element electrode 6 and to BHF used in forming contact holes. It was found that the Mo—Ti alloy can be etched without causing dissolution of resist by using a weak alkaline etchant (pH 7–9) containing an oxidizing agent having oxidation-reduction potential higher than that of Ti. It was also found that a W—Ti alloy exhibits excellent acid resistance. The alloy having an additional element such as Ta, Nb, Cr, Zr, and/or Hf other than Ti in an amount of about 5 atomic % exhibits the similar tendency. Of these alloys mentioned above, the alloy containing Xe and/or Kr in a predetermined amount was confirmed to exhibit various excellent characteristics.

In this embodiment, it was demonstrated that excellent characteristics of film will be obtained when a film is formed under the following conditions: temperature: room temperature to 300° C., power: 3 to 20 kW in the case of a device with a large display area, 1 to 4 in the case of a device with a small display area, pressure: 0.3 to 1.2 Pa, and distance between electrodes: 4 to 10 cm.

In the wiring of this embodiment, to improve the adherence between the wiring and the underlying layer (substrate), it is preferred to layer the film made of a nitride of a Kr-containing Mo—W alloy and the film made of an Mo—W alloy, alternately. However, of the films made of Mo—W alloys, in particular, the film made of the Mo—W alloy containing W in an amount of not more than 50 atomic % of W was found to exhibit an increase in the resistivity by not less than one order of magnitude when subjected to the annealing in the air. This is caused when the film surface is oxidized extremely. In this case, it was confirmed that if the film made of a nitride of an Mo—W alloy is mounted on the Mo—W alloy containing not more than 50 atomic % of W, the oxidation can be prevented and therefore the resistivity will not increase. More specifically, if the wiring is prepared by the steps of: first, forming the film of the Kr-containing Mo—W alloy by sputtering; forming the film of a nitride of the Mo—W alloy containing N in an amount of 50% or less thereon by sputtering; and then processing the thus-obtained by plasma using the gas mixture of $CF_4$ and $O_2$, the resultant wiring will be hardly oxidized and have low resistivity. This wiring can be formed in the same etching process as employed in forming the Mo—W alloy film. In this case, if nitrogen (N) is contained in an amount over 50 atomic %, the resistivity will rapidly increases. Therefore, it is necessary to set an N content to 50 atomic % or less.

(Embodiment 2)

In the embodiment which will be explained hereinafter, the same structural elements as those in Embodiment 1 are designated by the same reference numerals. The detailed descriptions thereof will be omitted for simplicity' sake. The structures in this embodiment different from those of Embodiment 1 are a liquid-crystal driving circuit board and a wiring material. FIG. 12 is a sectional view showing another liquid-crystal circuit board of the liquid-crystal display using electrode wiring material of the present invention. The liquid-crystal driving circuit board will be explained, focusing on the structure, manufacturing process of TFT and storage capacitance. On the glass substrate $10_1$ is formed a polycrystalline Si film 104 of 100 nm in thickness. On the film 104, a gate oxide film $107_3$ of 100 nm in thickness is formed. Further on the film $107_3$ is formed a gate electrode 102 made of a Mo—Ti alloy containing Kr in an amount of 0.01 atomic %. The Mo—Ti alloy contains Ti in an amount of 10 atomic %.

The gate electrode 102 was formed as follows: at first, the glass substrate $10_1$ was placed in a small load-lock sputtering apparatus of the sheet-fed type. The initial temperature of the substrate, the power for use in film formation and the distance between electrodes were set to 150° C., 2 kW, and 5.5 cm, respectively and then sputtering was performed in an atmosphere having a Kr gas pressure of 0.5 Pa using an Mo—Ti alloy target. Thereafter, the Mo—Ti alloy containing 10 atomic % of Ti was allowed to deposit on the glass substrate $10_1$ to form an Mo—Ti alloy film of 300 nm in thickness. In the film thus-formed, Kr was contained in an amount of 0.01 atomic % and the lattice constant was 3.14 angstrom, which is almost equal to the lattice constant of the Mo—Ti alloy in a bulk state. The resistivity of the Mo—Ti alloy film was 25 μΩ.cm, which is sufficiently low resistivity.

On the structure mentioned above, source/drain regions, namely, $n^+$ polycrystalline Si layers 103a and 103b, are formed and also a polycrystalline Si-active layer 104 is formed in island form. This is formed by injecting phosphorus in a dose amount of $1 \times 10^{16}$ $cm^{-3}$ using the gate electrode 102 as a mask. Furthermore, an interlayer insulating film $107_1$ is formed thereon in thickness of 300 nm by thermal CVD.

In the picture element region, ITO is deposited by sputtering in a thickness of 100 nm and patterned to thereby form a picture element electrode 206. In the interlayer (SiOx) $107_1$ of a contact region and gate region, contact holes are formed by etching using diluted HF. Further, the Kr-containing Mo—W alloy is allowed to deposit by sputtering thereon to form an Mo—W alloy film of 300 nm in thickness and then patterned, thereby forming a signal conductor, a source electrode (first main electrode) 106a and a drain electrode (second main electrode) 106b. The Mo—W alloy used herein contains 65 atomic % of W.

The signal conductor mentioned above was formed as follows: at first, a glass substrate $10_1$ was placed in the small sputtering apparatus of the sheet-fed load-lock type. The initial temperature of the substrate, power for use in film formation and distance between electrodes were set to 150° C., 3 kW, and 5 cm, respectively and then sputtering was performed in an atmosphere having a Kr gas pressure of 0.5 Pa using an Mo—W alloy target, thereby forming an Mo—W alloy film of 300 nm in thickness containing 65 atomic % of W. In the film thus-formed, Kr was contained in an amount of 0.01 atomic % and the lattice constant was 3.16 angstrom, which is almost equal to the lattice constant of the Mo—W alloy in a bulk state. The resistivity of the Mo—W alloy film was 15 μΩ.cm, which is sufficiently low resistivity.

On the TFT region, an SiNx film is formed by plasma CVD. Picture elements and a peripheral circuit connecting region are etched with RIE to form a passivation SiNx film $107_2$. In this manner, a liquid-crystal driving circuit substrate 110 is formed.

A liquid-crystal display device was formed in the same manner as in Embodiment 1 using the liquid-crystal driving circuit substrate 110 having the aforementioned structure. The evaluation of the liquid-crystal display device was performed in the same manner as in Embodiment 1, the same results as in Embodiment 1 were obtained. In addition, as compared to the conventional liquid-crystal display device using Al as a metal for a signal conductor, the following advantage was obtained: That is, a barrier metal is no longer necessary by adopting the Mo—W alloy having low resistance since the Mo—W alloy works not only as a signal conductor metal but also as a barrier metal, although the barrier metal having a high melting point such as Mo is required to insert under ITO or $n^+$ polycrystalline Si in the conventional device having Al signal line. As a result, the number of manufacturing steps is successfully reduced in the present invention.

(Embodiment 3)

This embodiment differs from Embodiment 1 in a liquid-crystal driving circuit board and a wiring material including a wiring material. FIG. 13 is a sectional view showing another liquid-crystal circuit board of the liquid-crystal display device employing the electrode wiring material of the present invention. The liquid-crystal driving circuit board employs the TFT having a structure obtained by etching an $n^+$ amorphous silicon on a channel. A storage capacitance region is formed of the same wiring layer as that of the gate electrode and data wiring. The liquid crystal driving circuit substrate is prepared as follows:

In the first place, on the glass substrate $10_1$, a gate electrode $112_1$ and a Cs wiring $112_2$ are integrally and simultaneously formed using the Mo—W alloy which is used as the wiring metal in Embodiment 1. The Mo—W alloy film is formed in the same manner as in Embodiment 1. Subsequently, an interlayer insulating film $117_3$ and an amorphous Si active layer 114, $n^+$ amorphous Si layers 115a and 115b are successively formed and patterned. Thereafter, a source electrode 116a and a drain electrode 116b are simultaneously formed of the wiring material mentioned above, an oxide film $117_1$ is formed thereon, and then contact holes are formed on the drain electrode 116b. Furthermore, a picture element electrode 216 is formed in the picture element region. An auxiliary capacitance is formed between the picture electrode 216 and the Cs wiring $112_2$.

A liquid-crystal display device was formed using the liquid-crystal driving circuit substrate 110 having the aforementioned structure in the same manner as in Embodiment 1. As the liquid-crystal display device was assessed in the same manner as in Embodiment 1, the same advantages as in Embodiment 1 were obtained. In addition, the following two advantages were obtained. First, etching was successively carried out by CDE in the manufacturing steps. Second, a barrier metal is not required since the Mo and W oxide films have low resistivity and therefore ITO can obtain a good contact.

In the Embodiments 1 to 3 mentioned above, individual structures are not limited to those of each Embodiment. For example, as the semiconductor material, use may be made of not only a polycrystalline Si or amorphous Si but also a microcrystalline Si classified therebetween. Furthermore, the semiconductors of CdSe or SiGe may be used. As the oxide film formed on the data wiring, use may be made of not only an oxide film but also a nitride film, a nitride oxide film. The switching element is not limited to a transistor. MIM and a diode may be used in place of the transistor. The electrode wiring material of the present invention may be applied to the electrode wiring for a simple-matrix liquid-crystal display device.

The alloys used in the aforementioned Embodiments may be a single layer as described in each Embodiment. Alternatively, the alloys may be a layered film consisting of at least two-layered films made of different alloy composition; for example, a layered film formed by layering the film made of an alloy which mainly consists of Mo and W and contains nitrogen on an Mo—W alloy film with the intention of preventing surface oxidation.

Alternatively, to improve acid resistance, a film made of a metal such as Ta, Ta—N, Ta—Mo, Ta—Nb, Ta—W, Ta—Nb—N, Ta—Mo—N, and Ta—W—N alloy or a mixture thereof is layered on the surface of the aforementioned Mo—W alloy film, namely, on the top surface of the Mo—W alloy film. The resistance may be further reduced by providing a film formed of Al, Cu or Au under the Mo—W alloy film.

Moreover, the present invention is not limited to the Embodiments mentioned above. The present invention can be carried out by modifying the Embodiments in various ways within the scope of the present invention.

(Embodiment 4)

FIG. 14 is a sectional view of a MOS transistor of DRAM employing the Mo—W alloy film containing Ar and Kr in an amount of 0.2 atomic % for each.

The specific structure of the DRAM is as follows: Reference numeral 41 is a single-crystalline Si substrate. On the single-crystalline substrate 41 is formed a LOCOS silicon oxide film 47$_3$. On the LOCOS silicon oxide film 47$_3$, a gate electrode 42 formed of an Mo—W alloy is mounted.

The Mo—W alloy film was formed as follows: in the first place, the single-crystalline substrate 41 was placed in the small sputtering apparatus of the sheet-fed load-lock type. The initial temperature of the substrate, power for use in film formation and distance between electrodes were set to 150° C., 2 kW, and 5.5 cm, respectively and then, sputtering was performed in an atmosphere having a Ar gas pressure of 0.3 Pa and a Kr gas pressure of 0.5 Pa, using an Mo—W alloy target, thereby obtaining an Mo—W alloy film of 300 nm in thickness containing 35 atomic % of W. The lattice constant was 3.16 angstrom, which is almost equal to the lattice constant of the Mo—W alloy in a bulk state. The resistivity of the Mo—W alloy film was 15 μΩ.cm, which is sufficiently low resistivity. The advantages of the present invention will be obtained by forming the film in an atmosphere containing an Ar gas or the like in addition to a Kr gas or Xe gas in order to add Ar or the like to the film in addition to Kr or Xe. The film properties can be controlled by adjusting the ratio of Ar and Kr/Xe content according to the required film properties.

On the gate electrode 42, a silicon nitride film 40 is formed. On the silicon nitride film 40, a field oxide film 47$_1$ is formed. In the field oxide film 47$_1$, contact holes reaching the n$^+$ areas 45a and 45b are formed. Inside the contact holes, Al source/drain electrodes 46a and 46b are formed.

In the DRAM, the gate electrode 42, which is formed of silicide such as polycrystalline Si or MoSi$_2$ causes a problematic delay in pulse when used as the wiring material between the word wirings of the DRAM because it has a high sheet resistivity of 1–5 Ω/□. In contrast, if the gate electrode 42 and word wiring (not shown) are formed using the same Kr-containing Mo—W alloy as used in Embodiment 1, the resistivity can be reduced to 0.3 Ω/□, which is lower approximately by one order of magnitude. In addition, since the Mo—W alloy is suitable for the gate wiring and word wiring owing to its excellent heat resistance, low resistivity and acid resistance, a DRAM excellent in its speed can be provided. In this case, the Mo—W alloy can be applied as a pad electrode other than wiring.

The use of electrode wiring substrate of the present invention is not limited to DRAM and, needless to say, it can be applied to other LSI such as ASIC, as well as in SRAM serving as a semiconductor memory device. Particularly, with respect to an electrode, the same material as used in the address wiring of Embodiment 1 can be used as a power element, a gate electrode such as thyristor such as GTO (gate turn-off thyristor, IGBT (insulated gate bipolar transistor), a lead electrode from a semiconductor layer.

As explained in the foregoing, the electrode wiring material of the present invention has sufficiently low resistivity since it contains at least one element selected from the group consisting of Mo and W as a main component and an additional element selected from the group consisting of Kr and Xe in an amount of 0.0003 atomic % to 3 atomic %, and further it is easy to handle.

The electrode wiring substrate of the present invention comprising electrode wiring formed on a glass substrate is characterized in that the electrode wiring is made of at least one metal selected from the group consisting of Mo and W, and that the lattice constant of the electrode wiring is nearly equal to that of the material in a bulk state, so that the electrode wiring has high reliance.

What is claimed is:

1. An electrode wiring material, consisting essentially of:
   (i) an alloy consisting essentially of Mo and W, and
   (ii) 0.0003–3 atomic percent of an additional element selected from the group consisting of Kr and Xe.

2. The electrode wiring material according to claim 1, wherein said Kr is contained in an amount of 0.0003 atomic % to 1 atomic %.

3. The electrode wiring material according to claim 1, wherein said Kr is contained in an amount of 0.0003 atomic % to 0.5 atomic %.

4. The electrode wiring material according to claim 3, wherein said Xe is contained in an amount of 0.001 atomic % to 1 atomic %.

5. The electrode wiring material according to claim 3, wherein said W or Mo is contained in an amount of 10 atomic % to 95 atomic %.

6. The electrode wiring material according to claim 3, having a resistivity of 20 μΩ.cm or less.

7. The electrode wiring material of claim 1, wherein said alloy further consists essentially of Ti.

8. An electrode wiring material, consisting essentially of:
   (i) an alloy consisting essentially of at least two members selected from the group consisting of Mo, W and Ti, and
   (ii) 0.0003–3 atomic percent of an additional element selected from the group consisting of Kr and Xe.

9. The electrode wiring material according to claim 8, wherein said Kr is contained in an amount of 0.0003 atomic % to 1 atomic %.

10. The electrode wiring material according to claim 8, wherein said Kr is contained in an amount of 0.0003 atomic % to 0.5 atomic %.

11. The electrode wiring material according to claim 8, wherein said Xe is contained in an amount of 0.001 atomic % to 1 atomic %.

12. The electrode wiring material according to claim 8, wherein said W or Mo is contained in an amount of 10 atomic % to 95 atomic %.

13. The electrode wiring material according to claim 8, having a resistivity of 20 μΩ.cm or less.

14. An electrode wiring substrate, comprising:
   (a) a substrate, and
   (b) electrode wiring comprising an alloy, on said substrate,
   wherein said alloy comprises Mo and W, and the lattice constant of said electrode wiring alloy is within ±3% of the lattice constant of a bulk alloy having a composition corresponding to said electrode wiring alloy.

15. The electrode wiring substrate of claim 14, wherein said alloy further comprises Ti.

16. The electrode wiring substrate of claim 14, wherein said lattice constant of said electrode wiring alloy is within ±1% of the lattice constant of said bulk alloy.

17. The electrode wiring substrate of claim 14, wherein said electrode wiring further comprises 0.0003–3 atomic percent of an additional element selected from the group consisting of Kr and Xe.

18. The electrode wiring substrate according to claim 17, wherein said Kr is contained in an amount of 0.0003 atomic % to 1 atomic %.

19. The electrode wiring substrate according to claim 17, wherein said Kr is contained in an amount of 0.0003 atomic % to 0.5 atomic %.

20. The electrode wiring substrate according to claim 17, wherein said Xe is contained in an amount of 0.001 atomic % to 1 atomic %.

21. The electrode wiring substrate of claim 14, wherein said electrode wiring comprises:
   (I) a first layer of said electrode wiring alloy, and
   (II) a second layer of a metal or an alloy comprising Ta, and optionally at least one member selected from the group consisting of N, Mo, Nb and W.

22. The electrode wiring substrate of claim 14, wherein said electrode wiring comprises:
   (I) a first layer comprising a metal selected from the group consisting of Al, Cu and Au, and
   (II) a second layer of said electrode wiring alloy.

23. The electrode wiring substrate according to claim 14, wherein said W or Mo is contained in an amount of 10 atomic % to 95 atomic %.

24. The electrode wiring substrate according to claim 14, wherein said electrode wiring is formed by a sputtering method.

25. The electrode wiring substrate according to claim 14, wherein said electrode wiring has a resistivity of 20 μΩ.cm or less.

26. An electrode wiring substrate, comprising:
   (a) a substrate, and
   (b) electrode wiring comprising an alloy, on said substrate,
   wherein said alloy comprises at least two members selected from the group consisting of Mo, W and Ti, and
   the lattice constant of said electrode wiring alloy is within ±3% of the lattice constant of a bulk alloy having a composition corresponding to said electrode wiring alloy.

27. The electrode wiring substrate of claim 26, wherein a lattice constant of said electrode wiring is within ±1% of the lattice constant of a bulk alloy corresponding to said alloy.

28. The electrode wiring substrate of claim 26, wherein said electrode wiring further comprises 0.0003–3 atomic percent of an additional element selected from the group consisting of Kr and Xe.

29. The electrode wiring substrate according to claim 4, wherein said Kr is contained in an amount of 0.0003 atomic % to 1 atomic %.

30. The electrode wiring substrate according to claim 4, wherein said Kr is contained in an amount of 0.0003 atomic % to 0.5 atomic %.

31. The electrode wiring substrate according to claim 4, wherein said Xe is contained in an amount of 0.0001 atomic % to 1 atomic %.

32. The electrode wiring substrate of claim 21, wherein said electrode wiring comprises:
   (I) a first layer of said electrode wiring alloy, and
   (II) a second layer of a metal or an alloy comprising Ta, and optionally at least one member selected from the group consisting of N, Mo, Nb and W.

33. The electrode wiring substrate of claim 26, wherein said electrode wiring comprises:
   (I) a first layer comprising a metal selected from the group consisting of Al, Cu and Au, and
   (II) a second layer of said electrode wiring alloy.

34. The electrode wiring substrate according to claim 26, wherein said W or Mo is contained in an amount of 10 atomic % to 95 atomic %.

35. The electrode wiring substrate according to claim 26, wherein said electrode wiring is formed by a sputtering method.

36. The electrode wiring substrate according to claim 26, wherein said electrode wiring has a resistivity of 20 μΩ.cm or less.

37. An electrode wiring material comprising:
   (i) an alloy comprising Mo and W, and
   (ii) 0.0003–3 atomic percent of an additional element selected from the group consisting of Kr and Xe,
   wherein said Mo or W is present in an amount of 10–95 atomic percent.

38. The electrode wiring material of claim 37, wherein said Mo or W is contained in an amount of 20–95 atomic percent.

39. The electrode wiring material of claim 37, wherein said Mo or W is contained in an amount of 25–95 atomic percent.

40. The electrode wiring material of claim 37, wherein said alloy further comprises at least one element selected from the group consisting of Ta, Nb, Cr, Zr and Hf.

41. The electrode wiring material of claim 37, consisting essentially of said Mo, said W, and said additional element.

42. An electrode wiring material, comprising:
(i) an alloy comprising at least two members selected from the group consisting of Mo, W and Ti, and
(ii) 0.0003–3 atomic percent of an additional element selected from the group consisting of Kr and Xe,
wherein said W is contained in an amount of 10–95 atomic percent.

43. The electrode wiring material of claim 42, wherein said W is contained in an amount of 20–95 atomic percent.

44. The electrode wiring material of claim 42, wherein said W is contained in an amount of 25–90 atomic percent.

45. The electrode wiring material of claim 42, wherein said alloy further comprises as least one element selected from the group consisting of Ta, Nb, Cr, Zr and Hf.

46. The electrode wiring material of claim 42, wherein said wiring material consists essentially of at least two members and said additional element.

47. A liquid crystal display device, comprising:
(I) an electrode wiring substrate, comprising:
 (a) a substrate, and
 (b) electrode wiring comprising an alloy, on said substrate,
 wherein said alloy comprises Mo and W, and the lattice constant of said electrode wiring alloy is within ±3% of the lattice constant of a bulk alloy having a composition corresponding to said electrode wiring alloy;
(II) an opposing substrate located opposite said electrode wiring substrate and having a counter electrode on an opposing face; and
(III) a liquid crystal layer between the electrode wiring substrate and the opposing substrate.

48. A liquid crystal display device, comprising:
(I) an electrode wiring substrate, comprising:
 (a) a substrate, and
 (b) electrode wiring comprising an alloy, on said substrate,
 wherein said alloy comprises at least two members selected from the group consisting of Mo, W and Ti, and
 the lattice constant of said electrode wiring alloy is within ±3% of the lattice constant of a bulk alloy having a composition corresponding to said electrode wiring alloy;
(II) an opposing substrate located opposite said electrode wiring substrate and having a counter electrode on an opposing face; and
(III) a liquid crystal layer between the electrode wiring substrate and the opposing substrate.

* * * * *